United States Patent [19]

Lethellier

[11] Patent Number: 4,729,086
[45] Date of Patent: Mar. 1, 1988

[54] POWER SUPPLY SYSTEM WHICH SHARES CURRENT FROM A SINGLE REDUNDANT SUPPLY WITH MULTIPLE SEGMENTED LOADS

[75] Inventor: Patrice R. A. Lethellier, San Diego, Calif.

[73] Assignee: Unisys Corporation, Detroit, Mich.

[21] Appl. No.: 74,612

[22] Filed: Jul. 17, 1987

[51] Int. Cl.⁴ .............................................. H02J 3/46
[52] U.S. Cl. ...................................... 363/65; 363/71;
307/53; 307/58; 307/64
[58] Field of Search ............................ 363/65, 69–72;
307/53, 55, 58, 64–66

[56] References Cited

U.S. PATENT DOCUMENTS

| | | | |
|---|---|---|---|
| 4,035,716 | 7/1977 | Hutchinson | 307/64 X |
| 4,270,165 | 5/1981 | Carpenter et al. | 307/58 X |
| 4,476,399 | 10/1984 | Yoshida et al. | 307/53 X |
| 4,528,458 | 7/1985 | Nelson et al. | 307/44 X |
| 4,609,828 | 9/1986 | Small | 307/64 X |
| 4,651,020 | 3/1987 | Kenny et al. | 307/64 X |
| 4,665,322 | 5/1987 | Eishima et al. | 363/71 X |

Primary Examiner—Patrick R. Salce
Assistant Examiner—Emanuel Todd Voeltz
Attorney, Agent, or Firm—Charles J. Fassbender; L. Joseph Marhoefer

[57] ABSTRACT

A power supply system includes a plurality of dedicated power supplies, each of which has a separate output terminal for furnishing output current to just one respective load. Each dedicated power supply has a switch for turning the supply on and off independent of the remaining dedicated supplies. A single redundant power supply is also included which turns on when every dedicated supply is on. And, a control circuit is included which shares output current from the redundant supply, when it is on, with the loads of only a subset of the dedicated supplies, such that the total shared output current from the redundant supply and the respective output current from each dedicated supply in the subset are all substantially equal. This subset consists of any dedicated supply which fails, and those dedicated supplies whose output current to their load when the redundant supply is off exceeds the equalized current.

11 Claims, 4 Drawing Figures

Fig. 2

|     | $t_1$ | $t_2$ | $t_3$ | $t_{4A}$ | $t_{4B}$ | $t_{4C}$ | $t_{4D}$ |
|---|---|---|---|---|---|---|---|
| $SW_1$ | CLOSE | OPEN | | | | | |
| $SW_2$ | CLOSE | | OPEN | | | | |
| $SW_3$ | CLOSE | | | OPEN | | | |
| $PS_{1A}$ | OFF | ON | | | | | |
| $PS_{1B}$ | OFF | ON | | | | | |
| $PS_{1C}$ | OFF | ON | | | | | |
| $PS_2$ | OFF | | ON | | | | |
| $PS_{3A}$ | OFF | | | ON | | | |
| $PS_{3B}$ | OFF | | | ON | | | |
| $PS_R$ | OFF | | | | | ON | |
| $PD_1$ | 0V | RB | | | | | 0V |
| $PD_2$ | 0V | | RB | | | | 0V |
| $PD_3$ | 0V | | | RB | | | 0V |
| $V_{C1}$ | 0C | 5.0V | | | | 4.41V | |
| $I_{L1A}$ | 0 | 250A | | | | | 191A |
| $I_{L1B}$ | 0 | 250A | | | | | 191A |
| $I_{L1C}$ | 0 | 250A | | | | | 191A |
| $CD_1$ | 0C | | FB | | FB | | 0V |
| $V_{C2}$ | 0C | | 4.0V | | | 4.0V | |
| $I_{L2}$ | 0 | | 150A | | | | |
| $CD_2$ | 0C | | RB | | FB | | RB |
| $V_{C3}$ | 0C | | | 4.5V | | 4.41V | |
| $I_{L3A}$ | 0 | | | 200A | | | 191A |
| $I_{L3B}$ | 0 | | | 200A | | | 191A |
| $CD_3$ | 0C | | | FB | FB | | 0V |
| $V_{CR}$ | 0C | | | | 2.5V | 4.41V | |
| $I_{R1}$ | 0 | | | | | | 177A |
| $I_{R2}$ | 0 | | | | | | 0A |
| $I_{R3}$ | 0 | | | | | | 14A | eq.1 ~ $\dfrac{(5V)(3S)+(4V)(1S)+(4.5V)(2S)+(2.5V)(1S)}{\div 7S} = 4.357V$ eq.2 ~ $4.357 > 4.0$ ∴ $CD_2 = RB$ eq.3 ~ $\dfrac{(5V)(3S)+(4.5V)(2S)+(2.5V)(1S)}{\div 6S} = 4.41V$ eq.4 ~ $\dfrac{4.41V - 2.5V}{1} = 1.91V \rightarrow 191A$

Fig.3

| | $t_{10}$ | $t_{11}$ | $t_{12}$ | $t_{13}$ | $t_{14}$ | $t_{15}$ |
|---|---|---|---|---|---|---|
| SW1 | OPEN | | | | | |
| SW2 | OPEN | | | | | |
| SW3 | OPEN | | | | | |
| | | | | | | |
| PS1A | ON | | | | | |
| PS1B | ON | FAIL | | ON | | |
| PS1C | ON | | | | | |
| PS2 | ON | | | | FAIL | |
| PS3A | ON | | | | | |
| PS3B | ON | | | | | |
| PSR | ON | | | | | |
| | | | | | | |
| PD1 | 0V | | | | | |
| PD2 | 0V | | | | | |
| PD3 | 0V | | | | | |
| | | | | | | |
| VC1 | 4.41V | UP | 5V | 4.41V | | 4.75V |
| IL1A | 191A | | 250A | 191A | | 225A |
| IL1B | 191A | 0 | | 191A | | 225A |
| IL1C | 191A | | 250A | 191A | | 225A |
| CD1 | 0V | FB | 0V | | RB | 0V |
| | | | | | | |
| VC2 | 4.0V | | | | | |
| IL2 | 150A | | | | 0 | |
| CD2 | RB | | | | OC | |
| | | | | | | |
| VC3 | 4.41V | | 4.5V | 4.41V | | 4.5V |
| IL3A | 191A | | 200A | 191A | | 200A |
| IL3B | 191A | | 200A | 191A | | 200A |
| CD3 | 0V | RB | | 0V | | |
| | | | | | | |
| VCR | 4.41V | UP | 5V | 4.41V | UP | 4.75V |
| IR1 | 177A | | 250A | 177A | | 75A |
| IR2 | 0 | | | | | 150A |
| IR3 | 14A | | 0 | 14A | | 0 | eq.1 ~ (5V)(3S)
+(4.5V)(2S)
+(4V)(1S)
÷6S
———
4.6V eq.2 ~ 4.6V ≠ 4.5V
∴ CD3 = RB eq.3 ~ (5V)(3S)
+(4V)(1S)
÷4S
———
4.75V eq.4 ~ 4.75V
−2.5
———
2.25V
↓
225A

Fig. 4

| | $t_{20}$ | $t_{21}$ | $t_{22}$ | $t_{23}$ | $t_{24}$ |
|---|---|---|---|---|---|
| $SW_1$ | OPEN | CLOSE | OPEN | | |
| $SW_2$ | OPEN | | | CLOSE | OPEN |
| $SW_3$ | OPEN | | | | |
| | | | | | |
| $PS_{1A}$ | ON | OFF | ON | | |
| $PS_{1B}$ | ON | OFF | ON | | |
| $PS_{1C}$ | ON | OFF | ON | | |
| $PS_2$ | ON | | | OFF | ON |
| $PS_{3A}$ | ON | | | | |
| $PS_{3B}$ | ON | | | | |
| $PS_R$ | ON | OFF | ON | OFF | ON |
| | | | | | |
| $PD_1$ | 0V | | | RB | 0V |
| $PD_2$ | 0V | RB | 0V | | |
| $PD_3$ | 0V | RB | 0V | RB | 0V |
| | | | | | |
| $V_{C1}$ | 4.41V | OC | 4.41V | 5.0V | 4.41V |
| $I_{L1A}$ | 191A | 0 | 191A | 250A | 191A |
| $I_{L1B}$ | 191A | 0 | 191A | 250A | 191A |
| $I_{L1C}$ | 191A | 0 | 191A | 250A | 191A |
| $CD_1$ | 0V | OC | 0V | FB | 0V |
| | | | | | |
| $V_{C2}$ | 4.0V | | | OC | 4.0V |
| $I_{L2}$ | 150A | | | 0 | 150A |
| $CD_2$ | RB | | | OC | RB |
| | | | | | |
| $V_{C3}$ | 4.41V | 4.5V | 4.41V | 4.5V | 4.41V |
| $I_{L3A}$ | 191A | 200A | 191A | 200A | 191A |
| $I_{L3B}$ | 191A | 200A | 191A | 200A | 191A |
| $CD_3$ | 0V | FB | 0V | RB | 0V |
| | | | | | |
| $V_{CR}$ | 4.41V | OC | 4.41V | OC | 4.41V |
| $I_{R1}$ | 177A | 0 | 177A | 0 | 177A |
| $I_{R2}$ | 0A | | | | |
| $I_{R3}$ | 14A | 0 | 14A | 0 | 14A |

POWER SUPPLY SYSTEM WHICH SHARES CURRENT FROM A SINGLE REDUNDANT SUPPLY WITH MULTIPLE SEGMENTED LOADS

BACKGROUND OF THE INVENTION

This invention relates to power supply systems which furnish DC current at a certain voltage to segmented electrical loads; and more particularly, it relates to such power supply systems which include a redundant current sharing power supply and which enable the various segmented loads to be turned off for repair while the remainder of the loads continue to operate.

Electrical loads, such as integrated circuits, frequently are packaged on printed circuit boards which have power and ground pins as well as multiple input-/output pins for receiving and sending signals. Hundreds of these boards are often included in a single electronic system, such as a large data processing system or a large communications system. Multiple backplanes are commonly provided to hold the boards in groups of 10 to 20, and each backplane has its own power and ground buses.

One way to provide power to such a multiple backplane system is to cable the power buses of all the backplanes together, and to connect them to a set of power supplies which operate in parallel to share in furnishing the total load current. Also, a redundant supply (i.e., an extra supply) can also be included in such a system so that if any one power supply fails, the electronic system can still operate. This type of power supply system, including a redundant supply, is described in U.S. patent application Ser. No. 934,025 by J. Miller and J. Walker which is assigned to the present assignee.

However, in a multiple backplane electronic system, it is often desirable to power down the circuitry on just one backplane while the circuitry on the remaining backplanes continues to operate. For example, large data processing systems often contain multiple digital computers, each of which is housed on a different backplane. When the circuitry in one of those computers fails, it is desirable to be able to power down just the backplane of the failed computer so that its circuitry can be repaired while at the same time, the remaining computers continue to operate. However, with the above referenced power supply system, this cannot be done because there, power cannot be independently applied to and removed from the individual backplanes.

One way to solve the above problem is to not connect the power buses of the backplanes together and to provide a separate set of power supplies, such as those of the referenced power supply system, for each backplane. But in that case, a separate redundant supply would also have to be provided for each backplane; and that would substantially increase the cost of the system. For example, consider an electronic system which has three backplanes A, B, and C. Suppose further that backplane A requires three power supplies to furnish its load current; backplane B requires just one power supply to furnish its load current; and backplane C requires two power supplies to furnish its load current. In that case, a total of six power supplies is required to furnish the needed load current, but an additional three redundant supplies (one for each backplane) is required to provide redundancy. Thus, the cost of the system is increased by 50%!

Accordingly, it is a primary object of the invention to provide a power supply system in which all of the above problems are avoided.

BRIEF SUMMARY OF THE INVENTION

In accordance with the present invention, a redundant power supply system is comprised of a plurality of dedicated power supply sets. All the supplies of any one set operate in parallel and share in furnishing equal amounts of output current to just one respective load. Each dedicated power supply set also has a switch for turning that set on and off independent of the remaining sets of dedicated supplies. Also included is a single redundant power supply which is coupled to the switches to turn on when every dedicated supply is on. Further included is a control circuit which shares output current from the single redundant supply, when it is on, with the dedicated supplies of only some of the sets. This control circuit equalizes the total shared output current from the redundant supply and the respective output current from each dedicated supply with which current is shared. Further, those loads with which current is shared consist of the load of any dedicated supply which happens to fail and the loads of those dedicated supplies whose output current, when the redundant supply is off, exceeds the equalized current that occurs when the redundant supply is on.

BRIEF DESCRIPTION OF THE DRAWINGS

Various details and advantages of the invention are described herein in conjunction with the accompanying drawings wherein:

FIG. 2 is a timing chart and a set of equations which illustrate how the FIG. 1 embodiment operates when the dedicated power supplies for its three loads are sequentially turned on;

FIG. 3 is a timing chart and a set of equations which illustrate how the FIG. 1 embodiment operates when some of its dedicated power supplies fail; and FIG. 4 is a timing chart which illustrates how the FIG. 1 embodiment operates when its dedicated power supplies are independently turned off to enable the repair of their corresponding load.

DETAILED DESCRIPTION OF THE INVENTION

Figure 1:
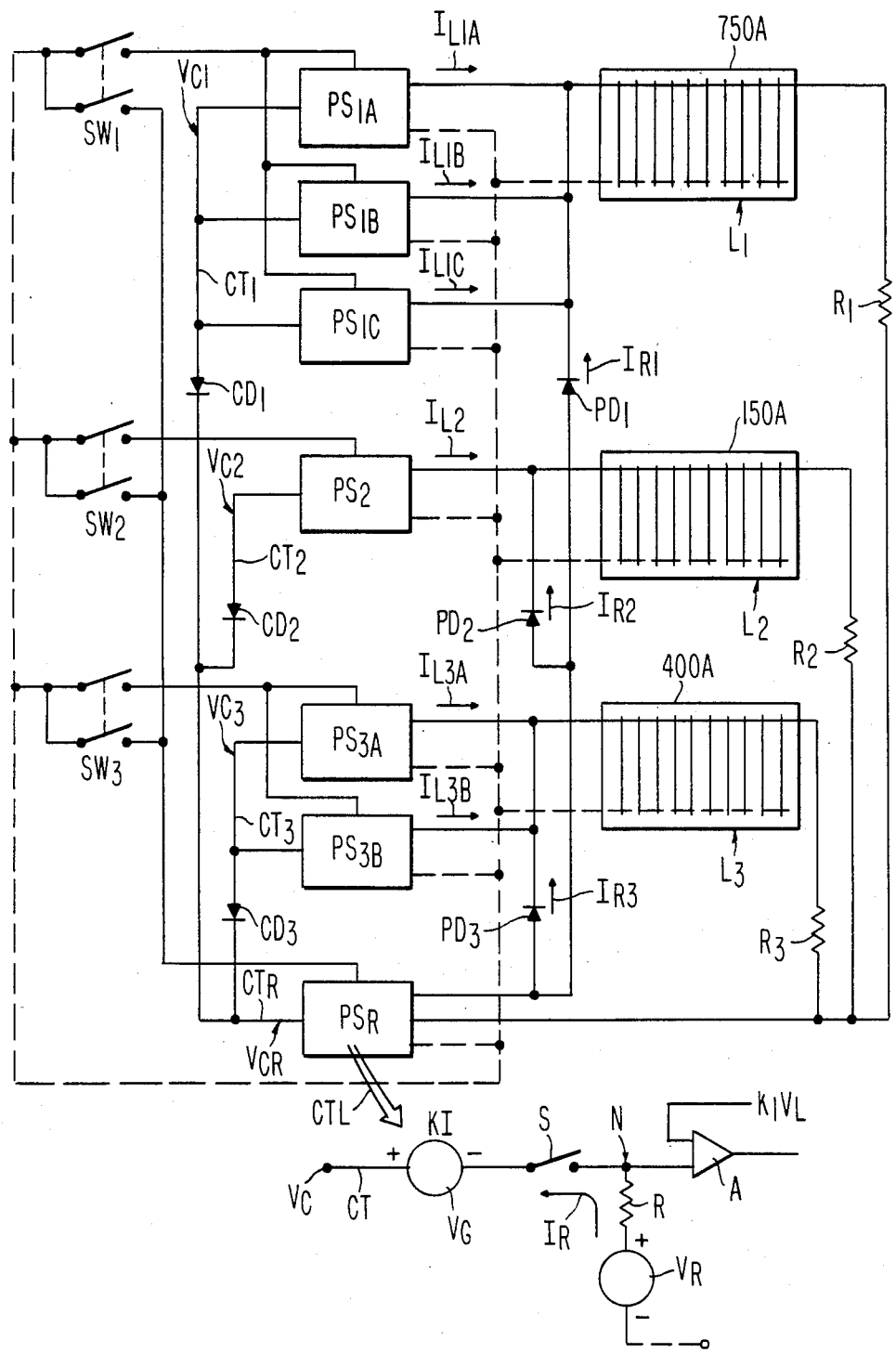
FIG. 1 is a detailed circuit diagram of one preferred embodiment of the invention.

Referring now to FIG. 1, a preferred embodiment of a power supply system which is constructed according to the invention will be described in detail. In this embodiment, three dedicated power supplies, $PS_{1A}$, $PS_{1B}$, and $PS_{1C}$ furnish current to just one load $L_1$; another dedicated power supply $PS_2$ furnishes current to just one load $L_2$; and two other dedicated power supplies $PS_{3A}$ and $PS_{3B}$ furnish current to just one load $L_3$. Load current from the power supplies $PS_{1A}$, $PS_{1B}$, and $PS_{1C}$ is respectively indicated in FIG. 1 as $I_{L1A}$, $I_{L1B}$, and $I_{L1C}$; load current from power supply $PS_2$ is indicated as $I_{L2}$; and load current from power supplies $PS_{3A}$ and $PS_{3B}$ is respectively indicated as $I_{L3A}$ and $I_{L3B}$.

All of the power supplies that are dedicated to a particular load furnish equal amounts of current to that load. For example, load $L_1$ draws an average of 750 amps, and each of the power supplies $PS_{1A}$, $PS_{1b}$ and $PS_{1C}$ share equally in supplying that current. Similarly, load $L_3$ draws an average of 400 amps; and each of the power supplies $PS_{3A}$ and $PS_{3B}$ shares equally in supplying that current. Each load is shown as a rectangle which contains internal vertical lines. Each rectangle represent a backplane, and the vertical lines represent printed circuit boards.

Also included in the FIG. 1 embodiment are three switches $SW_1$, $SW_2$, and $SW_3$. Switch $SW_1$ when it is open turns on the power supplies $PS_{1A}$, $PS_{1B}$ and $PS_{1C}$ independently of the other dedicated power supplies. Similarly, switch $SW_2$ when it is open independently turns on and turns off power supply $PS_2$; and switch $SW_3$ when it is open independently turns on and turns off power supplies $PS_{3A}$ and $PS_{3B}$.

Further included in the FIG. 1 embodiment is a single redundant power supply $PS_R$. This supply has its current output terminal coupled to each of the loads $L_1$, $L_2$, and $L_3$ through respective power diodes $PD_1$, $PD_2$, and $PD_3$. Also, this redundant supply has an on/off terminal which is coupled to each of the switches $SW_1$, $SW_2$, and $SW_3$ such that it turns on only when all of those switches are in their on position (i.e., open).

Included within the redundant power supply $PS_R$, as well as within each of the dedicated power supplies, is a control circuit CTL which, for simplicity, is shown only once in FIG. 1. This control circuit includes the serial combination of a switch S, a resistor R, a reference voltage $V_R$ and a voltage generator $V_G$. Switch S closes only when the corresponding power supply is operating; generator $V_G$ produces a voltage KI where K is a constant and I is the output current from the corresponding supply. Voltage $V_C$ is a control voltage on a control terminal CT of the circuit.

How the circuit operates within a set of paralleled supplies (such as $PS_{1A}$, $PS_{1B}$, and $PS_{1C}$) to equalize their load current is described in the previously referred-to application Ser. No. 934,025. Basically, the amount of current from the output terminal of a supply varies in proportion to the magnitude of its control voltage. When current $I_R$ flows into terminal CT, the voltage drop across resistor R adds to the reference voltage $V_R$, and that proportionately increases the control voltage $V_C$ and the voltage at node N. If the voltage at node N is larger than the voltage $k_1V_L$ (where $k_1$ is a constant and $V_L$ is the load voltage) which is sensed by error amplifier A, then the power supply increases its output current.

In FIG. 1, symbol $V_{C1}$ indicates the control voltage for the power supplies $PS_{1A}$, $PS_{1B}$, and $PS_{1C}$; symbol $V_{C2}$ indicates the control voltage for power supply $PS_2$; symbol $V_{C3}$ indicates the control voltage for power supplies $PS_{3A}$ and $PS_{3B}$; and symbol $V_{CR}$ indicates the control voltage for power supply $PS_R$. Also in FIG. 1, each dedicated supply senses the voltage at its own load in the usual manner (i.e., via a conductor from the load to a remote sense terminal on the supply), but this is not shown in FIG. 1 for simplicity. However, redundant supply $PS_R$ is different. It senses an average of the three load voltages through a resistor network $R_1$, $R_2$, and $R_3$. This compensates for any voltage drop which might occur in the power diodes. Each resistance $R_1$, $R_2$, and $R_3$ should be large enough to draw a current close to zero when the full load voltage is across it, which will occur when one set of dedicated supplies is off and another set is on.

Further included in the FIG. 1 system are control diodes $CD_1$, $CD_2$, and $CD_3$ which respectively couple the control terminals $CT_1$, $CT_2$, and $CT_3$ to control terminal $CT_R$ of the redundant supply. These control diodes operate to isolate the control voltages on any one set of dedicated supplies from the control voltage of any other set of dedicated supplies. In addition, the control voltages $V_{C1}$, $V_{C2}$, and $V_{C3}$ can forward bias their respective control diodes and thereby increase voltage $V_{CR}$ of the redundant supply. This will cause the redundant supply to furnish more current. Conversely, however, the redundant supply cannot increase the control voltage of the dedicated supplies because their control diodes will reverse bias.

Turning now to FIG. 2, the sequence by which the various supplies in the FIG. 1 system turn on will be described. To begin, at time $t_1$, all of the switches $SW_1$, $SW_2$, and $SW_3$ are closed, and so all of the power supplies in the system are off. In that state, all of the load currents are zero; all of the power diodes have no voltage across them; and all of the control diodes are in an open circuit.

Thereafter, at time $t_2$, switch $SW_1$ is opened; and as a result the power supplies $PS_{1A}$, $PS_{1B}$, and $PS_{1C}$ turn on. Output currents $I_{L1A}$, $I_{L1B}$, and $I_{L1C}$ are thus furnished from those power supplies to load $L_1$. But that current is inhibited from going to any of the other loads $L_2$ and $L_3$ by power diode $PD_1$ which reverse biases.

Due to the operation of the control circuit in power supplies $PS_{1A}$, $PS_{1B}$, and $PS_{1C}$, the total current to load $L_1$ of 750 amps is split equally between the three supplies. Also, the magnitude of control voltage $V_{C1}$ becomes proportional to the amount of current from each supply. For example, if in the control circuit $V_R$ is 2.5 volts and K is 1 volt per 100 amps of output current, then control voltage $V_{C1}$ will equal 5 volts.

Later at time $t_2$, suppose switch $SW_2$ opens. In response, power supply $PS_2$ turns on and furnishes output current $I_{L2}$ of 150 amps to its load $L_2$. Current $I_{L2}$ is prevented from flowing to any of the other loads $L_1$ and $L_3$ by power diode $PD_2$ which reverse biases, and control voltage $V_{C2}$ becomes proportional to the amount of output current $I_{L2}$. Assuming again a $V_R$ of 2.5 volts and a K of 1 volt per 100 amps, $V_{C2}$ will equal 4.0 volts.

Since control voltage $V_{C2}$ is less than control voltage $V_{C1}$, the control diode $CD_1$ will tend to become forward biased. However, control diode $CD_2$ is reverse biased, and thus the control circuits in power supplies $PS_{1A}$, $PS_{1B}$, and $PS_{1C}$ do not interact with the control circuit in power supply $PS_2$.

Next, suppose switch $SW_3$ opens and so power supplies $PS_{3A}$ and $PS_{3B}$ turn on. This is indicated as occurring at time $t_{4A}$. When power supplies $PS_{3A}$ and $PS_{3B}$ are on, they supply current to load $L_3$; and power diode $PD_3$ prevents that current from flowing to any other load. Also, the control circuit in power supplies $PS_{3A}$ and $PS_{3B}$ equalizes their output current to 200 amps each, and control voltage $VC_3$ becomes proportional to it. Again assuming a $V_R$ of 2.5 volts and a K of 1 volt per 100 amps, $V_{C3}$ will equal 4.5 volts.

At the same time, the redundant power supply $PS_R$ will turn on because all of the switches $SW_1$, $SW_2$, and $SW_3$ are now in an on position. For clarity, however, this is shown as occurring in FIG. 2 at time $t_{4B}$ which is just an instant after time $t_{4A}$. When supply $PS_R$ initially turns on, switch S in its control circuit closes; reference voltage $V_R$ is at 2.5 volts; and voltage KI is at or near 0. Thus, all of the control diodes $CD_1$, $CD_2$, and $CD_3$ become forward biased.

Due to this forward biasing, control current flows from the control circuits of all of the dedicated power supplies to the control circuit of the redundant power supply; and that tends to equalize the output current from all the supplies. If the output currents did in fact equalize, then the control voltages $CT_1$, $CT_2$, $CT_3$, and $CT_R$ would also equalize to a value which is given by equation 1 as 4.357 volts. In equation 1, the term (5 V)(3S) represents the control voltage of 5 volts for three supplies $PS_{1A}$, $PS_{1B}$, and $PS_{1C}$; the term (4 V)(1S) represents the control voltage of 4 volts for power supply $PS_2$; the term (4.5 V)(2S) represents the control voltage of 4.5 volts for two power supplies $PS_{3A}$ and $PS_{3B}$; the term (2.5 V)(1S) represents the control voltage of 2.5 volts for power supply $PS_R$; and the term 7S represents a total of seven supplies.

But in the power supply system of FIG. 1, the control voltages $V_{C1}$, $V_{C2}$, $V_{C3}$ and $V_{CR}$ cannot all equalize to 4.357 volts. This is because 4.357 volts is greater than the 4 volts that is on terminal $CT_2$ when power supply $PS_2$ is furnishing all of the current to its load without any help from the redundant supply. Thus, if control voltage $V_{C2}$ got raised to 4.357 volts, load $L_2$ would be receiving too much current.

In the FIG. 1 system, control diode $CD_2$ reverse biases to prevent control voltage $V_{C2}$ from going too high. This is indicated by equation 2. Control voltage $V_{CR}$ from the redundant power supply ramps up from 2.5 volts toward 4.357 volts; but at the point where voltage $V_{CR}$ reaches 4 volts, diode $CD_2$ cuts off.

At that point, only the remaining dedicated supplies participate in sharing current with the redundant supply. This means that only control voltages $V_{C1}$, $V_{C3}$, and $V_{CR}$ will tend to equalize. Equation 3 calculates this new equalized control voltage as 4.41 volts.

Voltage $V_{CR}$ can be raised to 4.41 volts without reverse biasing the control diodes $CD_1$ and $CD_3$. This is because 4.41 volts is less than 5.0 control voltage of power supplies $PS_{1A}$, $PS_{1B}$, and $PS_{1C}$ which occurs when they furnish all of the current to load $L_1$, and it is less than the 4.5 control voltage of power supplies $PS_{3A}$ and $PS_{3B}$ which occurs when they furnish all of the current to load $L_3$. Thus, the equalized control voltage of 4.41 volts will actually be attained. This is indicated as occurring at time $t_{4C}$.

Each power supply which has a control voltage of 4.41 volts generates an output current of 191 amps from its output terminal. This current is calculated, as shown by equation 4, by subtracting reference voltage $V_R$ of 2.5 volts from the control voltage and multiplying the remainder by the constant K of 100 amps per volt.

Each of the 191 amp currents $I_{L1A}$, $I_{L1B}$, and $I_{L1C}$ go only to the load $L_1$, but they total just 573 amps. Consequently, the remainder of the 750 amps which load $L_1$ requires comes from the redundant supply through power diode $PD_1$. This is indicated in FIG. 2 at time $t_{4D}$. Similarly, power supplies $PS_{3A}$ and $PS_{3B}$ each furnish 191 amps to their load $L_3$; and the remaining current which that load requires is furnished by the redundant supply through power diode $PD_3$.

Consider now those changes which occur in the FIG. 1 system when a power supply fails. Those changes are shown in detail in FIG. 3. There, the initial state of the system at time $t_{10}$ is the same as that which was just described at time $t_{4D}$. Then, at time $t_{11}$, power supply $PS_{1B}$ fails to operate. Such a failure can be due to the shorting, opening, or deterioration of various components in the supply. This condition is sensed by the supply by means which are known in the art and need not be described here.

As the output current from the failed power supply $PS_{1B}$ is reduced to 0, power supplies $PS_{1A}$ and $PS_{1C}$ respond by increasing their output current. This in turn increases their control voltage $V_{Cl}$, and thus control diode $CD_1$ becomes forward biased. Consequently a control current flows through control diode $CD_1$ which increases control voltage $V_{CR}$ of the redundant power supply. Thus more output current flows from power supply $PS_R$ and the control voltages $V_{CR}$ and $V_{C1}$ tend to equalize.

When equality between the control voltages $V_{C1}$ and $V_{CR}$ is reached, each of the power supplies $PS_{1A}$, $PS_{1C}$, and $PS_R$ will be supplying equal amounts of current (250 amps) to the 750 amp load $L_1$. And, a 250 amp load current is indicated by a control voltage of 5.0 volts. This is shown in FIG. 3 at time $t_{12}$. Also, with the control voltages $V_{C1}$ and $V_{CR}$ equal to 5 volts, the control diodes $CD_2$ and $CD_3$ will be reversed biased. Consequently, power supplies $PS_{3A}$ and $PS_{3B}$ will furnish all of the current to their load $L_3$, and power supply $PS_2$ will continue to furnish all of the current to its load $L_2$.

Assume now that at some later time the failed power supply is replaced by a repairman. This is indicated as occurring at time $t_{13}$. When that happens, power supplies $PS_{1A}$, $PS_{1B}$, and $PS_{1C}$ again share equally in furnishing current to their load $L_1$ since they have the same control voltage $CT_1$; and thus the state of a FIG. 1 system returns to that which is previously was at time $t_{10}$.

Thereafter, suppose that power supply $PS_2$ fails. This is shown as occurring at time $t_{14}$. When that happens, the output current $I_{L2}$ from power supply $PS_2$ ramps down to zero, and the output current $I_{R2}$ from the redundant power supply $PS_R$ increases to make up the difference. Thus the control voltage $V_{CR}$ of the redundant supply increases.

How high the control voltage $V_{CR}$ goes is calculated in FIG. 3 by equations 1, 2, and 3. Equation 1 gives the control voltage which would occur if all of the operating supplies were furnishing equal amounts of current. That voltage equals 4.6 volts. But power supplies $PS_{3A}$ and $PS_{3B}$ cannot have a control voltage of 4.6 volts because then their load $L_3$ would be receiving more current than it requires. Consequently, control diode $CD_3$ reverse biases as the control voltage $V_{CR}$ reaches 4.5 volts. This is stated by equation 2.

Next, equation 3 calculates the control voltage which will occur if the remaining operable power supplies $PS_{1A}$, $PS_{1B}$, $PS_{1C}$, and $PS_R$ furnish equal amounts of the load current. That control voltage is 4.75 volts. Such a control voltage can in fact occur on the control terminal for power supplies $PS_{1A}$, $PS_{1B}$, and $PS_{1C}$ because when it does, the total output current from those supplies will be less than the current which its load $L_1$ requires.

Given a reference voltage $V_R$ of 2.5 volts and a constant K of 100 amps per volt, a control voltage of 4.75 volts corresponds to an output current of 225 amps. This current will be furnished by each of the supplies $PS_{1A}$, $PS_{1B}$, $PS_{1C}$, and $PS_R$. All of the current from the supplies $PS_{1A}$, $PS_{1B}$, and $PS_{1C}$ goes to load $L_1$; and the remaining current which that load requires comes from power supply $PS_R$ through power diode $PD_1$. At the same time, power supply $PS_R$ furnishes all of the current which load $L_2$ requires through power diode $PD_2$. This is indicated in FIG. 3 at time $t_{15}$.

At some later time, the failed power supply $PS_2$ can be replaced by a repairman. And, when that occurs, the state of the FIG. 1 system will revert back to that which occured at times $t_{10}$ and $t_{13}$.

Consider now FIG. 4 which illustrates how the FIG. 1 system operates when some of the switches $SW_1$, $SW_2$, and $SW_3$ are used to turn off their corresponding power supplies. Here again, the initial state of the system which is illustrated at time $t_{20}$ corresponds to that which was previously described in FIG. 2 as occurring at time $t_{4D}$.

Thereafter, at time $t_{21}$, switch $SW_1$ is closed; and in response, the corresponding power supplies $PS_{1A}$, $PS_{1B}$, and $PS_{1C}$ turn off. Also, the redundant power supply $PS_R$ turns off. When that occurs, switch S in the control circuit of the redundant power supply opens; and thus the control diodes $CD_2$ and $CD_3$ of the remaining supplies which are operating are in an open circuit. Consequently, power supply $PS_2$ furnishes all of the current to its load $L_2$, and power supplies $PS_{3A}$ and $PS_{3B}$ furnish all of the current to their load $L_3$.

While the supplies $PS_{1A}$, $PS_{1B}$, $PS_{1C}$ and $PS_R$ are off, load $L_1$ can be repaired. For example, printed circuit boards in the load $L_1$ backplane can be pulled out and replaced. At the same time, loads $L_2$ and $L_3$ can continue to operate. This state continues until switch $SW_1$ is again opened. When that occurs, such as at time $t_{22}$, the system reverts back to the initial state which it had at time $t_{20}$.

Next, suppose switch $SW_2$ is closed. This is shown as occurring at time $t_{23}$. When that happens, power supply $PS_2$ turns off, and the redundant power supply $PS_R$ also turns off. Since power supply $PS_R$ is off, switch S in its control circuit opens, and so the control diodes $CD_1$ and $CD_3$ of the remaining operating power supplies are open circuited. Thus, power supplies $PS_{1A}$, $PS_{1B}$, and $PS_{1C}$ will furnish all of the current to their load $L_1$; power supplies $PS_{3A}$ and $PS_{3B}$ will furnish all the current to their load $L_3$; and lead $L_2$ can be worked on for repairs. This state continues to exist until at some later time such as $t_{24}$, switch $SW_2$ is again opened. When that occurs, the power supply system again reverts back to the initial state which it has at time $t_{20}$.

Note that in all of the preceding description, the voltage drop across the control diodes $CD_1$, $CD_2$, and $CD_3$ is assumed to be zero. In actuality, however, some small voltage drop will occur across those diodes. But, the effect of that drop is simply to make the output current from the redundant supply $PS_R$ slightly smaller than the output current from those dedicated supplies whihc participate in current sharing. In any case, this effect can be made negligible by making the constant K in each control circuit large.

Note also that throughout the preceding description, the voltage drop across the power diodes $PD_1$, $PD_2$, $PD_3$ is assumed to be zero. In actuality, however, those diodes will have a small voltage drop when they conduct which varies slightly with the amount of current through them. For example, a diode which carries 100 amps may have a drop of 0.6 volts while a diode which caries 10 amps may have a drop of 0.5 volts. But the effect of this on the overall operation of the system is simply that the amount of current which the redundant supply $PS_R$ furnishes to the individual loads will vary slightly (e.g., by a few amps) from that which has been described.

Finally, it should be noted that due to various manufacturing tolerances, the reference voltage $V_R$ in the control circuit of each supply might vary slightly (e.g., by a few millivolts) from one supply to another. And in that case it is necessary to have the redundant supply be the one with the smallest reference voltage. This is because current sharing between the redundant supply and each set of dedicated supplies is unidirectional due to the control diodes. If $V_R$ of the redundant supply is higher than $V_R$ of a set of dedicated supplies, then $V_C$ of the redundant supply will also be higher so the control diodes will reverse bias and no current sharing with that set of dedicated supplies will occur.

To avoid this problem, one can measure $V_R$ of each supply and then hand pick the supply with the lowest $V_R$ as the redundant supply. Alternatively, a manual adjustment can be included on the reference voltage circuitry of each supply which enables $V_R$ to be shifted slightly up or down. As another alternative, a resistor such as 500 ohms can be connected between the output terminal of the redundant supply $PS_R$ and its remote sense terminal. This resistor will be in parallel with the three resistors $R_1$, $R_2$, and $R_3$; so that will automatically raise the voltage on the remote sense terminal of the redundant supply by a few millivolts. Power supply $PS_R$ will then react, as if its output voltage actually was a few millivolts too high, by lowering its load current I. Thus the term KI in the control circuit of supply $PS_R$ will be lowered; and that will lower the control voltage of supply $PS_R$.

A preferred embodiment of the invention has now been described in detail. However, many changes and modifications can be made to these details without departing from the nature and spirit of the invention. For example, the invention can be used to provide power to any number of independently operable loads, not just three loads as shown in FIG. 1. Also, any number of dedicated power supplies can be paralleled to provide current to any one load. Alternatively, and in the simplest form of the invention, each load may have just one dedicated power supply.

Further, the invention can be used to supply power at negative voltages to segmented loads, not just power at positive voltages as shown in FIG. 1. To achieve that, the direction of the power diodes need only be reversed so they carry current from each load to the negative output terminal of the redundant supply. Similarly, negative voltages, rather than positive voltages, can be used in the control circuit to regulate the amount of output current from each supply; and in that case, the direction of the control diodes would have to be reversed.

Accordingly, it is to be understood that this invention is not limited to the above details but is defined by the appended claims.

What is claimed is:

1. A power supply system which is comprised of:
   a plurality of dedicated power supplies, each of which has a separate output terminal for furnishing output current to just one respective load;
   each dedicated power supply also having a switch for turning the supply on and off independent of the remaining dedicated supplies;
   a single redundant power supply which is coupled to said switches to turn on only when every dedicated supply is on;
   a current output terminal on said redundant supply which is coupled in parallel through a set of unidirectional conductors to the output terminal of every dedicated power supply;
   said redundant supply as well as each dedicated supply having a control circuit, with a control terminal which varies the amount of current from the output terminal of the corresponding supply in proportion to the magnitude of a control voltage on the control terminal; and an equalizing means coupled to the control terminal of each supply for substantially equalizing the output current of just a subset of said dedicated power supplies with the output current of said redundant supply, when it is on, by equalizing their control voltage; said subset consisting of any dedicated supply which fails and those dedicated supplies whose control voltage decreases when it is equalized.

2. A power supply system according to claim 1 wherein said equalizing means includes a set of unidirectional conductors which conduct from the control terminals of said dedicated supplies to the control terminal of said redundant supply, but not vice versa.

3. A power supply system according to claim 1 wherein at least one dedicated power supply of said plurality is grouped within a respective set of dedicated supplies and wherein all the supplies of any one set are connected in parallel and have the same control voltage.

4. A power supply system according to claim 1 wherein each control circuit includes a serial combination of a resistor, a switch which closes when the corresponding supply is operating, and a means which generates a voltage signal whose magnitude indicates the amount of load current from the corresponding supply.

5. A power supply system according to claim 1 wherein said unidirectional conductors are power diodes.

6. A power supply system according to claim 1 wherein each of said dedicated supplies has its output terminal connected to a separate backplane, and wherein each backplane holds multiple printed circuit boards with integrated circuits.

7. A power supply system which is comprised of:
a plurality of dedicated power supplies, each of which has a separate output terminal for furnishing output current to just one respective load,
each dedicated power supply also having a means for turning the supply on and off independent of the remaining dedicated supplies;
a single redundant power supply which is coupled to turn on when every dedicated supply is on; and
a means for sharing output current from said redundant supply, when it is on, with the loads of only a subset of said dedicated supplies, such that the total shared output current from said redundant supply and the respective output current from each dedicated supply in said subset are all substantially equal;
said subset consisting of any dedicated supply which fails and those dedicated supplies whose output current to their load when said redundant supply is off exceeds the equalized current.

8. A power supply system according to claim 7 wherein said means for sharing includes a respective control circuit in each dedicated supply which varies the amount of load current from the supply in response to a control signal, a set of diodes which couple the control signal of each control circuit to said redundant supply, and a control circuit associated with said redundant supply that selects which dedicated supplies share current with said redundant supply by forward biasing their diodes and reverse biasing the diodes to the remaining dedicated supplies.

9. A power supply system according to claim 7 wherein said means for sharing includes a single output terminal on said redundant supply which furnishes said shared current, and a set of diodes which couple said output terminal on said redundant supply to the output terminal of each dedicated supply.

10. A power supply system according to claim 7 wherein at least one dedicated power supply of said plurality is grouped within a respective set of supplies, and wherein all the supplies of any one set furnish equal amounts of current to their load.

11. A redundant power supply system which is comprised of:
a plurality of dedicated power supplies, each of which has a separate output terminal for furnishing output current to just one respective load;
each dedicated power supply also having a means for turning the supply on and off independent of the remaining dedicated supplies;
a single redundant power supply which is coupled to turn on when every dedicated supply is on; and
a means for sharing output current from said redundant supply, when it is on, with the loads of any dedicated supply which happens to fail.

* * * * *